United States Patent
Komura et al.

(10) Patent No.: US 6,892,549 B2
(45) Date of Patent: May 17, 2005

(54) VEHICLE AIR CONDITIONER

(75) Inventors: Masato Komura, Kariya (JP);
Kimihiko Sato, Handa (JP); Yasutane Hijikata, Nagoya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/731,537

(22) Filed: Dec. 9, 2003

(65) Prior Publication Data

US 2004/0112074 A1 Jun. 17, 2004

(30) Foreign Application Priority Data

Dec. 13, 2002 (JP) .......................... 2002-362169

(51) Int. Cl.⁷ ............................ F25B 1/00; F25B 49/00; F25B 27/00
(52) U.S. Cl. .......................... 62/228.5; 62/230; 62/236; 62/323.1
(58) Field of Search ............................ 62/228.4, 228.5, 62/229, 230, 236, 323.1, 323.3

(56) References Cited

U.S. PATENT DOCUMENTS

| 5,867,996 | A |   | 2/1999 | Takano et al. |   |
|---|---|---|---|---|---|
| 6,745,585 | B2 | * | 6/2004 | Kelm et al. | 62/236 |
| 6,755,033 | B2 | * | 6/2004 | Iwanami et al. | 62/133 |
| 2004/0035127 | A1 | * | 2/2004 | Adaniya et al. | 62/236 |
| 2004/0045307 | A1 | * | 3/2004 | Iwata et al. | 62/228.1 |
| 2004/0079098 | A1 | * | 4/2004 | Uno et al. | 62/236 |

* cited by examiner

Primary Examiner—Marc Norman
(74) Attorney, Agent, or Firm—Harness, Dickey & Pierce, PLC

(57) ABSTRACT

In a vehicle air conditioner, a compressor is driven by a vehicle engine, and a displacement of the compressor is controlled based on a cooling load. When a post-evaporator air temperature (TE) is higher than a predetermined value (TEO+$\beta$), it is determined that the cooling load is large, and the compressor is forcibly controlled at maximum displacement that is larger than a control value controlled based on the cooling load. Accordingly, the post-evaporator air temperature (TE) can be rapidly reduced to be lower than the predetermined value (TEO+$\beta$), so that a driving time of the vehicle engine can be made shorter. As a result, fuel consumption efficiency of the vehicle engine can be effectively improved.

18 Claims, 4 Drawing Sheets

VEHICLE AIR CONDITIONER

CROSS-REFERENCE TO RELATED APPLICATION

This application is related to and claims priority from Japanese Patent Application No. 2002-362169 filed on Dec. 13, 2002, the content of which is hereby incorporated by reference.

BACKGROUND OF THE INVENTION

1. Field of the Invention

The present invention relates to a vehicle air conditioner having a variable displacement compressor that is driven at least by a vehicle engine. The vehicle air conditioner performs air-conditioning of a passenger compartment by controlling the discharge capacity of the variable displacement compressor from an outside based on a cooling load of the passenger compartment.

2. Description of Related Art

In a vehicle air conditioner described in U.S. Pat. No. 5,867,996 (corresponding to JP-A-10-236151), a variable displacement compressor is driven by a vehicle engine when a cooling load of the vehicle air conditioner is larger than a predetermined value. Further, when the cooling load of the vehicle air conditioner is lower than the predetermined value, the variable displacement compressor is driven by an electric motor. However, in this vehicle air conditioner, the displacement (discharge capacity) of the variable displacement compressor is controlled based on the cooling load. Therefore, after the cooling load becomes higher than the predetermined value, the displacement is increased slowly in accordance with the cooling load. As a result, a long time is necessary until the cooling load becomes lower than the predetermined value. In this case, the variable displacement compressor needs to be driven by the vehicle engine for the long time, so fuel consumption efficiency of the vehicle engine is deteriorated.

SUMMARY OF THE INVENTION

In view of the above problem, it is an object of the present invention to improve fuel consumption efficiency of a vehicle engine in a vehicle air conditioner that performs air-conditioning of a passenger compartment by controlling displacement of a variable displacement compressor based on a cooling load of the passenger compartment from an outside. The variable displacement compressor can be driven by the vehicle engine.

According to the present invention, a vehicle air conditioner includes a refrigerant cycle that at least has a variable displacement compressor driven by an engine for compressing refrigerant, and an evaporator for cooling air to be blown into a passenger compartment of the vehicle by performing a heat exchange between the air and low-pressure low-temperature refrigerant in the refrigerant cycle supplied by the compressor. The compressor is capable of adjusting its displacement from an outside, and an air-conditioning control unit controls the displacement of the compressor based on a cooling load in the passenger compartment. In the vehicle air conditioner, the air-conditioning control unit outputs an engine drive signal for requiring a drive of the engine, and the compressor is driven by the engine, when the cooling load is larger than a predetermined value. On the other hand, the air-conditioning control unit prohibits an output of the engine drive signal when the cooling load is equal to or smaller than the predetermined value. In addition, when the cooling load is larger than the predetermined value, the air-conditioning control unit controls the displacement of the compressor at a control value larger than a value controlled based on the cooling load, at least for a predetermined time. Accordingly, when the cooling load increases larger than the predetermined value, the cooling load can be rapidly reduced to be smaller than the predetermined value, and an operation time of the engine only for the vehicle air conditioner can be reduced. Thus, fuel consumption efficiency of the vehicle engine can be effectively improved.

Preferably, when the cooling load is equal to or smaller than the predetermined value while it is determined that the engine is stopped, the compressor is operated by an electric motor. Therefore, cool air can be blown into the passenger compartment even when the cooling load is smaller than the predetermined value.

According to the present invention, the air-conditioning control unit controls the displacement of the compressor at the control value larger than the value controlled based on the cooling load, immediately after the cooling load becomes larger than the predetermined value. Further, the air-conditioning control unit controls the displacement of the compressor at the control value larger than the value controlled based on the cooling load, until the cooling load becomes lower than the predetermined value. For example, the control value larger than the value controlled based on the cooling load is a maximum displacement of the compressor.

For example, the air-conditioning control unit calculates the cooling load based on at least a deviation between an actual temperature of the evaporator and a target temperature of the evaporator. Alternatively, the air-conditioning control unit calculates the cooling load based on at least a deviation between an actual temperature of air immediately after passing through the evaporator and a target temperature of air immediately after passing through the evaporator.

Preferably, when the cooling load is equal to or smaller than the predetermined value while it is determined that the engine is stopped, the air-conditioning control unit prohibits the output of the engine drive signal. In this case, an engine-starting frequency can be reduced, and the fuel consumption efficiency of the engine can be further improved. Further, when the cooling load is equal to or smaller than the predetermined value while it is determined that the engine is operated, the compressor is operated by the engine. In this case, the compressor can be operated by effectively using the operation of the engine.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the appended drawings.

Figure 1:
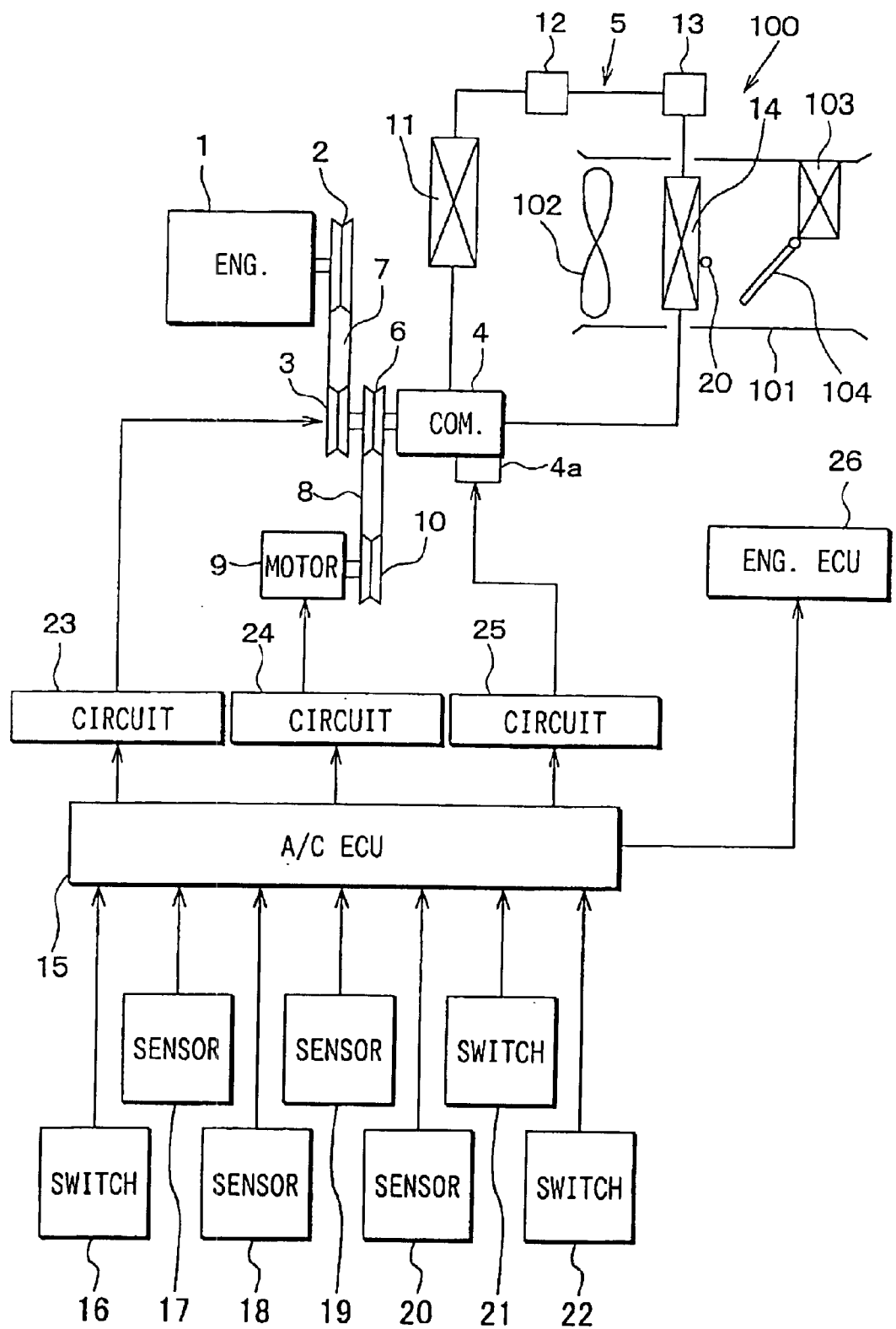
FIG. 1 is a schematic diagram showing a vehicle air conditioner according to a preferred embodiment of the present invention.

FIG. 1 shows a general structure of a vehicle air conditioner. In FIG. 1, a driving pulley 2 is provided on an output shaft of a vehicle engine 1 for running a vehicle, and is rotated to be operatively linked with an operation of the vehicle engine (E/G) 1.

A receiving pulley 6 is provided on a drive shaft of a compressor 4 that is a part of a vehicle refrigerant cycle 5. The receiving pulley 6 and a rotation shaft of a solenoid clutch 3 are arranged on the same axis. A belt 7 used as a motive-power transmitting member is hung on the driving pulley 2 and the solenoid clutch 3. In this way, when the solenoid clutch 3 is energized to be connected to the compressor 4 through the receiving pulley 6, the compressor 4 is driven and operated by the vehicle engine 1.

The compressor 4 can be driven not only by the vehicle engine 1, but also by an electric motor 9 mounted on a vehicle. The electric motor 9 is operated by receiving electric power from a vehicle battery (not shown). A driving pulley 10 is provided on an output shaft of the electric motor 9. A belt 8 used as a motive-power transmitting member is hung on the driving pulley 10 and the receiving pulley 6. Thus, when the compressor 4 is driven by the electric motor 9 while an operation of the vehicle engine 1 is stopped, the connection between the vehicle engine 1 and the compressor 4 is interrupted by de-energizing the solenoid clutch 3. Then, the compressor 4 is driven and operated by the electric motor 9. The compressor 4 is constructed by a variable displacement compressor capable of changing its displacement from an outside. More specifically, a swash-plate variable displacement compressor having a solenoid control valve 4a can be used as the compressor 4. In the swash-plate variable displacement compressor, an angle of a swash plate is changed by controlling a pressure in a crank chamber (not shown), so that its displacement is changed.

The refrigerant cycle 5 includes the compressor 4, a condenser 11, a receiver 12, an expansion valve 13, an evaporator 14 and the like. The condenser 11 condenses and liquefies high-temperature high-pressure refrigerant compressed by and discharged from the compressor 4. The receiver 12 separates the condensed and liquefied refrigerant into gas refrigerant and liquid refrigerant. The expansion valve 13 decompresses and expands the separated liquid refrigerant flowing out of the receiver 12, and the evaporator 14 evaporates the expanded low-temperature low-pressure refrigerant from the expansion valve 13.

An air conditioning unit 100, for supplying conditioned air into a passenger compartment, includes an air conditioning case 101 for forming an air passage through which air flows into the passenger compartment. The air conditioning unit 101 includes a fan 102 for blowing air in the air passage of the air conditioning case 101, the evaporator 14, a heater core 103 and an air mixing door 104. The evaporator 14 is disposed in the air conditioning case 101 so that refrigerant in the evaporator 14 is evaporated by receiving heat from air in the air passage of the air conditioning case 101. Therefore, air passing through the evaporator 14 is cooled. The heat core 103 is disposed downstream of the evaporator 14 in the air conditioning case 101 to heat air passing therethrough by using engine-cooling water as a heating source. The air mixing door 14 is disposed to adjust an air amount passing through the heater core 103 and an air amount bypassing the heater core 103, so that conditioned air having a predetermined temperature can be obtained. Plural air outlets, from which conditioned air is blown to upper and lower half bodies of a passenger and an inner surface of a windshield in the passenger compartment, are provided in the air conditioning case 101 at a downstream air side of the heater core 103.

An air-conditioning control unit (air conditioning ECU, A/C ECU) 15 is a computer unit including a central processing unit (CPU), a read only memory (ROM), a random access memory (RAM) and the like. When an ignition switch 16 used as a vehicle running switch is turned on, electric power is supplied to the air conditioning ECU 15 from the vehicle battery (not shown). Signals are input to the air conditioning ECU 15 from an inside air temperature sensor 17, an outside air temperature sensor 18, a sunlight sensor 19, a post-evaporator air temperature sensor 20, a temperature setting device 21 (switch), an air conditioning switch 22 and the like. The inside air temperature sensor 17 detects an air temperature in the passenger compartment, and the outside air temperature sensor 18 detects an outside air temperature outside the passenger compartment. The sunlight sensor 19 detects a sunlight amount radiated into the passenger compartment, and the post-evaporator air temperature sensor 20 detects an air temperature (post-evaporator air temperature) TE immediately after passing through the evaporator 14. The temperature setting device 21 is used for setting a target air temperature in the passenger compartment, and the air conditioning switch 22 is used for introducing a start operation of the compressor 4.

The air conditioning ECU 15 performs a predetermined calculation process based on the input signals described above. Then, the air conditioning ECU 15 controls a clutch control circuit 23, a motor drive circuit 24 and the displacement control circuit 25. Specifically, the air conditioning ECU 15 controls an output or a non-output of a clutch connection signal Scl to the clutch control circuit 23, so that the solenoid clutch 3 is energized, or de-energized. The air conditioning ECU 15 controls an output or a non-output of a motor drive signal Smo to the motor drive circuit 24, so that operation of the electric motor 9 is controlled. The air conditioning ECU 15 controls an output of a displacement control signal to the displacement control circuit 25, so that the solenoid control valve 4a is controlled. Further, the air conditioning ECU 15 controls an output or not-output of an engine drive signal Sen to an engine ECU 26. For example, the engine ECU 26 inputs a signal from the air conditioning ECU 15 and vehicle-side requirement signals such as a vehicle speed signal, and controls the on-off operation of the vehicle engine 1.

Figure 2:
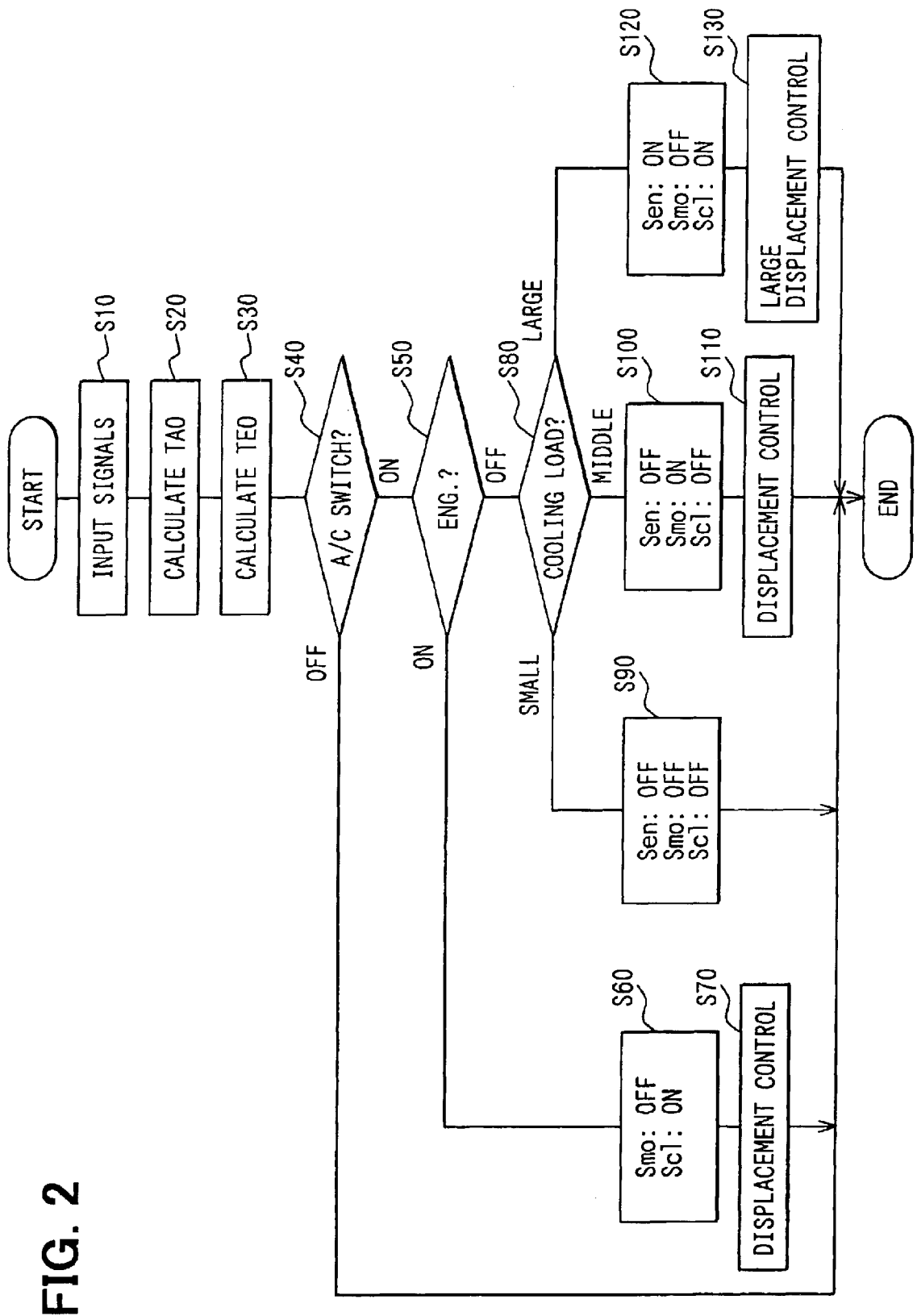
FIG. 2 is a flow diagram showing a control process performed by an air-conditioning control unit according to the preferred embodiment.
Figure 3:
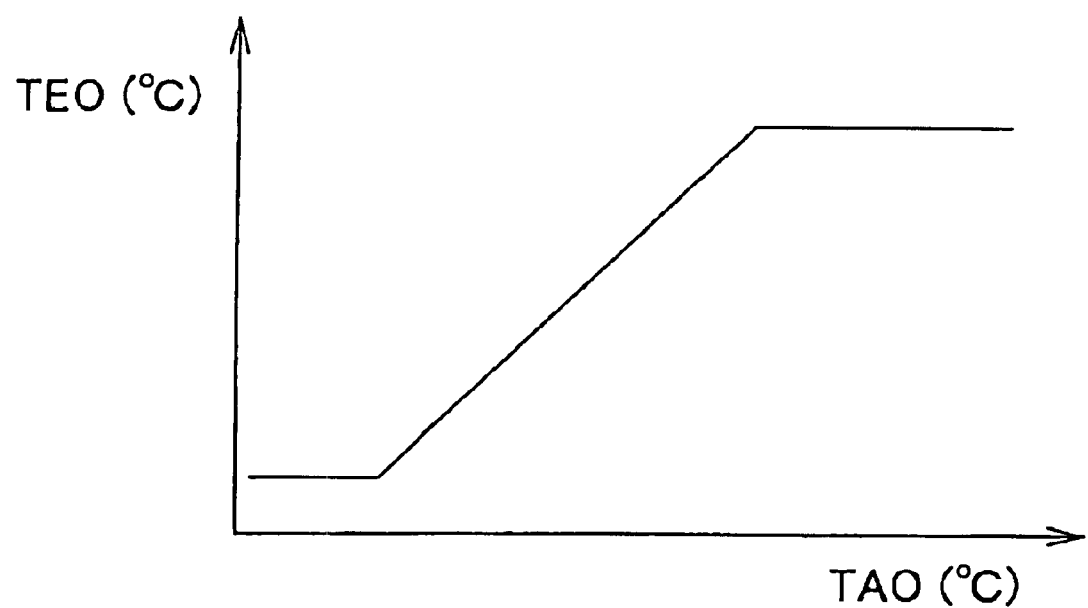
FIG. 3 is a graph showing a relationship between a target air temperature TAO and a target post-evaporator air temperature TEO, according to the preferred embodiment.
Figure 4:
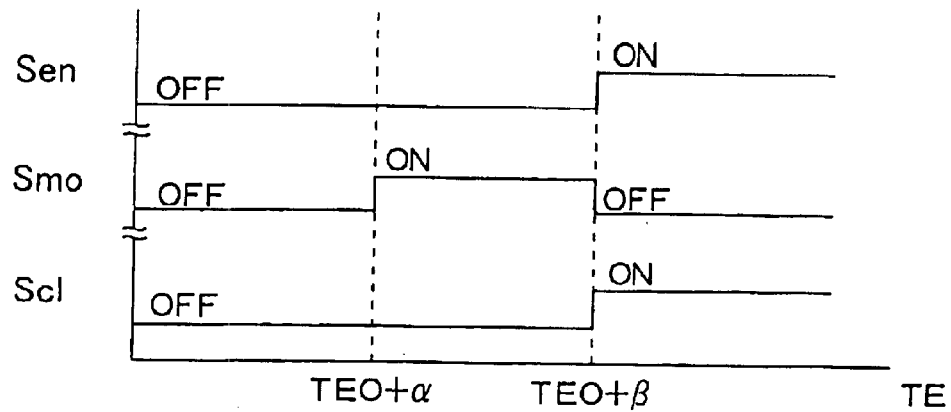
FIG. 4 is a graph showing a relationship between a post-evaporator air temperature TE, and on-off states of an engine drive signal Sen, a motor drive signal Smo and a clutch connection signal Scl, according to the preferred embodiment.

Next, a control process of the air conditioning ECU 15 will be described with reference to FIGS. 2–4. When the ignition switch 16 is turned on, the control routine shown in FIG. 2 is started. Then, at step S10, the signals from the sensors 17–20, the temperature setting device 21 and the air conditioning switch 22 are input to the air conditioning ECU 15. At step S20, a target air temperature TAO to be blown into the passenger compartment is calculated by using the following formula (1) based on the signals from the inside air temperature sensor 17, the outside air temperature sensor 18, the sunlight sensor 19 and the temperature setting device 21.

$$TAO = Kset \times Tset - Kr \times Tr - Kam \times Tam - Ks \times Ts - C \quad (1)$$

Wherein, Tset is a set temperature set by the temperature setting device 21, Tr is the air temperature in the passenger compartment detected by the inside air temperature sensor 17, Tam is the outside air temperature detected by the outside air temperature sensor 18, and Ts is the sunlight amount entering into the passenger compartment detected by the sunlight sensor 19. Further, Kset, Kr, Kam and Ks are coefficients of values corresponding to the signals, and C is a control constant. That is, a deviation between the set temperature Tset set by the temperature setting device 21 and the inside air temperature Tr detected by the inside air temperature sensor 17 is corrected by using a condition such as the outside air temperature Tam and the sunlight amount Ts, so that the target air temperature TAO can be obtained. At step S30, a target post-evaporator air temperature TEO, which is a target temperature of the post-evaporator air temperature TE, is calculated by using the graph shown in FIG. 3 based on the target air temperature TAO calculated at step S20.

At step S40, it is determined whether or not the air conditioning switch 22 is turned on. When the air conditioning switch 22 is in a turning off state, the compressor 4 is not required to be driven. In this case, the control routine is returned to the starting state of the air conditioning ECU 15 without performing any control process.

When the air conditioning switch 22 is in a turning on state, it is determined at step S50 whether or not the vehicle engine 1 is in a driving state, based on the vehicle-side requirement signal such as the vehicle speed signal. When it is determined based on the vehicle-side requirement signal that the vehicle engine 1 is in the driving state, the compressor 4 can be driven by motive power from the vehicle engine 1. Therefore, at step S60, the motor drive signal Smo is not output (OFF), but the clutch connection signal Scl is output (ON). In this way, the operation of the electric motor 9 is stopped, but the solenoid clutch 3 is energized, so that the vehicle engine 1 and the compressor 4 are connected to each other. Accordingly, the compressor 4 can be operated by the vehicle engine 1.

At step S70, the displacement of the compressor 4 is controlled based on a cooling load of the evaporator 14, that is, a cooling load of the passenger compartment. For example, the cooling load of the evaporator 14 is the deviation between the post-evaporator air temperature TE and the target post-evaporator air temperature TEO detected by the post-evaporator air temperature sensor 20. Specifically, as the cooling load increases, the displacement of the compressor 4 is controlled to be increased. Thereafter, the control routine is returned to the starting state.

On the other hand, it is determined at step S50 that the vehicle engine 1 is not in a driving state, the compressor 4 is controlled at steps S80–S130, in accordance with the cooling load. That is, the operation state of the compressor 4 is controlled, and the driving source of the compressor 4 and the displacement of the compressor 4 are controlled, in accordance with the cooling load. Specifically, at step S80, the cooling load is determined based on the post-evaporator air temperature TE and the target post-evaporator air temperature TEO. When the post-evaporator air temperature TE is lower than a first predetermined value (e.g., the target post-evaporator air temperature TEO+α), it is determined that the cooling load is small, so the compressor 4 is not required to be driven. Therefore, in this case, at step S90, the engine drive signal Sen, the motor drive signal Smo and the clutch connection signal Scl are not output (OFF), as shown in FIG. 4. In this way, the vehicle engine 1 is not operated, the electric motor 9 is not operated, and the solenoid clutch 3 is de-energized. That is, in this case, the engine stop state determined at step S50 is maintained.

When the post-evaporator air temperature TE is higher than the first predetermined value (TEO+α) and lower than a second predetermined temperature (TEO+β), it is determined that the cooling load is middle (i.e., intermediate level). Here, α<β. In this case, at step S100, the engine drive signal Sen and the clutch connection signal Scl are not output (OFF), but the motor drive signal Smo is output (ON), as shown in FIG. 4. That is, the air conditioning ECU 15 prohibits an output of the engine drive signal Sen and an output of the clutch connection signal Scl. Accordingly, the vehicle engine 1 stops, the solenoid clutch 3 is de-energized, and the electric motor 9 is driven. Then, at step S110, the displacement of the compressor 4 is controlled. In this embodiment, because the output capacity of the electrical motor 8 for driving the compressor 4 is not so large, the displacement of the compressor 4 cannot be controlled to be large. Accordingly, when the cooling load is the middle (i.e., the intermediate level), the compressor 4 is controlled at a predetermined intermediate displacement, for example, at 40% of its maximum displacement). Thereafter, the control routine is returned to the starting state. Here, when the electric motor 9 has a large output capacity, the displacement of the compressor 4 can be controlled in accordance with the cooling load.

When the post-evaporator air temperature TE is higher than the second predetermined value (TEO+β), the cooling load is determined to be large at step S80, and the control routine proceeds to step S120. At step S120, the engine drive signal Sen and the clutch connection signal Scl are output (ON), but the motor drive signal Smo is not output (OFF), as shown in FIG. 4. In this way, the vehicle engine 1 is driven, the solenoid clutch 3 is energized, and the electric motor 9 stops.

At step S130, the displacement of the compressor 4 is controlled. This control is a main part in the present invention. In this embodiment, the displacement of the compressor 4 is controlled at a control value that is larger than a control value determined based on the cooling load. For example, when the cooling load is large, the displacement of the compressor 4 is controlled at a maximum displacement (i.e., 100% displacement). Thereafter, the control routine is returned to the starting state.

Next, advantages according to this embodiment will be described with reference to FIG. 5. As described above, in this embodiment, when the compressor 4 is driven by the electric motor 9, the compressor 4 is controlled at the intermediate displacement (e.g., 40% of the maximum displacement). Therefore, when the post-evaporator air temperature TE excessively increases due to a temperature increase of introduction air (i.e., inside air or outside air) of the evaporator 14, this temperature of the post-evaporator air temperature TE cannot be reduced by the intermediate displacement of the compressor 4, that is, by an intermediate refrigerant flow amount in the evaporator 14. Thus, the post-evaporator air temperature TE increases higher than the second predetermined value (i.e., TEO+β). In this case, the driving source of the compressor 4 is changed from the electric motor 9 to the vehicle engine 1. Although the displacement of the compressor 4 is increased due to this change of the driving source, an actual temperature of the evaporator 14 does not rapidly reduce. Even if the actual temperature of the evaporator 14 starts to reduce, the post-evaporator air temperature TE continues to increase due to a response delay of the post-evaporator air temperature sensor 20.

Figure 5:
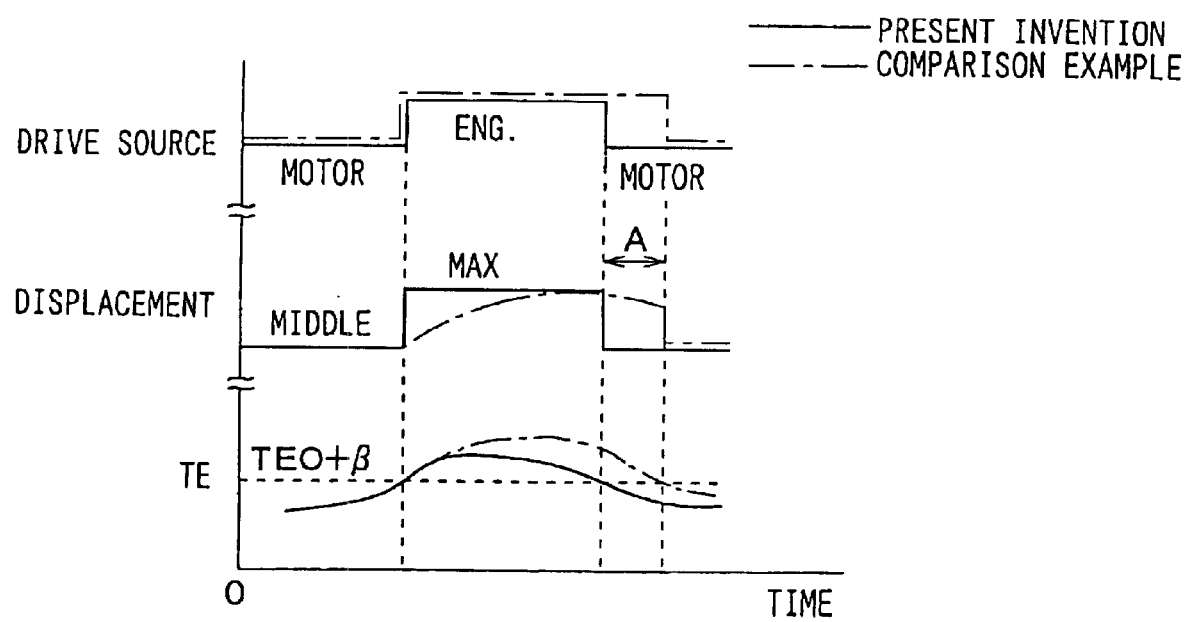
FIG. 5 is a time chart showing a relationship between a passing time, and a driving source of a compressor, a displacement of the compressor and the post-evaporator air temperature TE, according to the preferred embodiment.

If the displacement of the compressor 4 is controlled based the cooling load, that is, the deviation between the post-evaporator air temperature TE and the target post-evaporator air temperature TEO, the post-evaporator air temperature TE slowly increases, so the displacement of the compressor 4 slowly increases, as indicated by one-dot chain lines shown in FIG. 5. Because the displacement of the compressor 4 cannot rapidly increase, it is difficult to rapidly reduce the post-evaporator air temperature TE. After a long time passes, the post-evaporator air temperature TE starts to reduce, and becomes lower than the second predetermined value (TEO+β). Then, the driving source of the compressor 4 is changed from the vehicle engine 1 to the electric motor 9. In this control of the comparison example, the vehicle engine 1 is driven for a long time, thereby deteriorating fuel consumption efficiency of the vehicle engine 1.

On the other hand, in this embodiment, the compressor 4 is controlled at the maximum displacement, directly after the post-evaporator air temperature TE becomes higher than the second predetermined value (TEO+β). Therefore, as indicated by solid lines shown in FIG. 5, the post-evaporator air temperature TE can be rapidly reduced to be lower than that the second predetermined value (TEO+β). As a result, the driving time of the vehicle engine 1 can be reduced than that in the comparison example by a time period A shown in FIG. 5, thereby effectively improving the fuel consumption efficiency of the vehicle engine 1.

Further, in this embodiment, after the post-evaporator air temperature TE reduces lower than the second predetermined value (TEO+β), the compressor 4 is driven by the electric motor 9. Therefore, even when the post-evaporator air temperature TE reduces lower than the second predetermined value (TEO+β), cool air can be blown into the passenger compartment. Further, the compressor 4 is controlled at the maximum displacement, immediately after the post-evaporator air temperature TE becomes higher than the second predetermined value (TEO+β). Therefore, the post-evaporator air temperature TE can be rapidly reduced lower than the second predetermined value (TEO+β), and the operation of the vehicle engine 1 can be stopped in a short time, thereby further improving the fuel consumption efficiency of the vehicle engine 1.

Further, according to this embodiment of the present invention, the compressor 4 is controlled at the maximum displacement until the post-evaporator air temperature TE reduces to be lower than the second predetermined value (TEO+β). Therefore, the post-evaporator air temperature TE can rapidly reduce to be lower than the second predetermined value (TEO+β). Thus, the operation of the vehicle engine 1 can be stopped for a short tome, thereby further improving the fuel consumption efficiency of the vehicle engine 1.

Although the present invention has been fully described in connection with the preferred embodiment thereof with reference to the accompanying drawings, it is to be noted that various changes and modifications will become apparent to those skilled in the art.

For example, in the above-described embodiment, as the compressor 4, a hybrid compressor that is driven by both of the vehicle engine 1 and the electric motor 9 is used. However, the above-described control can be used for a compressor that is driven by only the vehicle engine 1. Even in this case, the fuel consumption efficiency can be effectively improved.

In the above-described embodiment, when the cooling load is large, that is, when the post-evaporator air temperature TE is higher than the second predetermined value (TEO+β),the compressor 4 is controlled at the maximum displacement (100% displacement). However, the compressor 4 can be controlled at a displacement that is higher than a control value controlled based on the cooling load.

In the above-described embodiment, the compressor 4 is controlled at the maximum displacement immediately after the post-evaporator air temperature TE becomes higher than the second predetermined value (TEO+β). However, after a predetermined time passes after the post-evaporator air temperature TE becomes higher than the second predetermined value (TEO+β), the compressor 4 can be controlled at the maximum displacement, or at a displacement higher than the control value determined based on this large cooling load. In the above-described embodiment, the compressor 4 is controlled at the maximum displacement until the post-evaporator air temperature TE becomes lower than the second predetermined value (TEO+β). However, for example, the compressor 4 can be controlled at the maximum displacement until a predetermined time, counted by a counting device such as a timer, passes. Here, the compressor 4 can be controlled at any displacement higher than the control value controlled based on this large cooling load, until the predetermined time passes. Thereafter, the displacement of the compressor 4 can be generally controlled in accordance with the cooling load.

In the above-described embodiment, the solenoid clutch 3 is provided between the vehicle engine 1 and the compressor 4. The solenoid clutch 3 is energized when the compressor 4 is driven by the vehicle engine 1, and is de-energized when the compressor 4 is driven by the electric motor 9. However, the solenoid clutch 3 may be eliminated. In this case, for example, the motive power of the vehicle engine 1 is always transmitted to the compressor 4 while the electric motor 9 is connected to the compressor 4 through a one-way clutch. When the compressor 4 is driven by the vehicle engine 1, the operation of the electric motor 9 can be stopped through the one-way clutch. The compressor 9 can be driven by the electric motor 9 through the one-way clutch. In this case, when the operation of the compressor 4 is stopped, the compressor 4 is controlled at a minimum displacement to be substantially stopped.

In the above-described embodiment, the cooling load is calculated based on the deviation between the post-evaporator air temperature TE and the target post-evaporator air temperature TEO. However, the cooling load can be calculated based on a deviation between an actual temperature of the evaporator 14 and a target temperature of the evaporator 14. In this case, in place of the post-evaporator air temperature TE and the target post-evaporator air temperature TEO, the actual temperature of the evaporator 14 and the target temperature of the evaporator 14 can be used. Alternately, the cooling load may be calculated by using a refrigerant temperature or a refrigerant pressure at a low pressure side and a target refrigerant temperature or a target refrigerant pressure at the low pressure side.

Such changes and modifications are to be understood as being within the scope of the present invention as defined by the appended claims.

What is claimed is:

1. An air conditioner for a vehicle having an engine for running the vehicle, the air conditioner comprising:
    a refrigerant cycle including
        a variable displacement compressor, driven at least by the engine, for compressing refrigerant, the compressor being capable of adjusting its displacement from an outside, and
        an evaporator for cooling air to be blown into a passenger compartment of the vehicle by performing a heat exchange between the air and low-pressure low-temperature refrigerant in the refrigerant cycle supplied by the compressor; and
    an air-conditioning control unit for controlling the displacement of the compressor based on a cooling load in the passenger compartment, wherein:
    the air-conditioning control unit outputs an engine drive signal for requiring a drive of the engine, and the compressor is driven by the engine, when the cooling load is larger than a predetermined value;
    the air-conditioning control unit prohibits an output of the engine drive signal when the cooling load is equal to or smaller than the predetermined value; and
    when the cooling load is larger than the predetermined value, the air-conditioning control unit controls the displacement of the compressor at a control value larger than a value controlled based on the cooling load, at least for a predetermined time.

2. The air conditioner according to claim 1, wherein the air-conditioning control unit controls the displacement of the compressor at the control value larger than the value controlled based on the cooling load, immediately after the cooling load becomes larger than the predetermined value.

3. The air conditioner according to claim 1, wherein the air-conditioning control unit controls the displacement of the compressor at the control value larger than the value controlled based on the cooling load, until the cooling load becomes lower than the predetermined value.

4. The air conditioner according to claim 1, wherein the control value larger than the value controlled based on the cooling load is a maximum displacement of the compressor.

5. The air conditioner according to claim 1, wherein the air-conditioning control unit calculates the cooling load based on at least a deviation between an actual temperature of the evaporator and a target temperature of the evaporator.

6. The air conditioner according to claim 1, wherein the air-conditioning control unit calculates the cooling load based on at least a deviation between an actual temperature of air immediately after passing through the evaporator and a target temperature of air immediately after passing through the evaporator.

7. The air conditioner according to claim 1, wherein:
    when the cooling load is equal to or smaller than the predetermined value while it is determined that the engine is stopped, the air-conditioning control unit prohibits the output of the engine drive signal.

8. The air conditioner according to claim 7, wherein:
    when the cooling load is equal to or smaller than the predetermined value while it is determined that the engine is operated, the compressor is operated by the engine.

9. The air conditioner according to claim 1, wherein:
    when the cooling load is equal to or smaller than the predetermined value while it is determined that the engine is stopped, the compressor is operated by an electric motor.

10. An air conditioner for a vehicle having an engine for running the vehicle, the air conditioner comprising:
    a refrigerant cycle including
        a variable displacement compressor, driven by at least one of the engine and an electric motor, for compressing refrigerant, the compressor being capable of adjusting its displacement from an outside, and
        an evaporator for cooling air to be blown into a passenger compartment of the vehicle by performing a heat exchange between the air and low-pressure low-temperature refrigerant in the refrigerant cycle supplied by the compressor; and
    an air-conditioning control unit for controlling the displacement of the compressor based on a cooling load in the passenger compartment, wherein:
    the air-conditioning control unit outputs an engine drive signal for requiring a drive of the engine, and the compressor is driven by the engine, when the cooling load is larger than a predetermined value;

the air-conditioning control unit prohibits an output the engine drive signal while outputting a motor drive signal for requiring a drive of the electric motor, and the compressor is driven by the electric motor, when the cooling load is equal to or smaller than the predetermined value; and when the cooling load is larger than the predetermined value, the air-conditioning control unit controls the displacement of the compressor at a control value larger than a value controlled based on the cooling load, at least for a predetermined time.

11. The air conditioner according to claim 10, wherein the air-conditioning control unit controls the displacement of the compressor at the control value larger than the value controlled based on the cooling load, immediately after the cooling load becomes larger than the predetermined value.

12. The air conditioner according to claim 10, wherein the air-conditioning control unit controls the displacement of the compressor at the control value larger than the value controlled based on the cooling load, until the cooling load becomes lower than the predetermined value.

13. The air conditioner according to claim 10, wherein the control value larger than the value controlled based on the cooling load is a maximum displacement of the compressor.

14. The air conditioner according to claim 10, wherein the air-conditioning control unit calculates the cooling load based on at least a deviation between an actual temperature of the evaporator and a target temperature of the evaporator.

15. The air conditioner according to claim 10, wherein the air-conditioning control unit calculates the cooling load based on at least a deviation between an actual temperature of air immediately after passing through the evaporator and a target temperature of air immediately after passing through the evaporator.

16. The air conditioner according to claim 10, wherein:

when the cooling load is equal to or smaller than the predetermined value while it is determined that the engine is stopped, the compressor is operated by the electric motor.

17. The air conditioner according to claim 16, wherein:

when the cooling load is equal to or smaller than the predetermined value while it is determined that the engine is operated, the compressor is operated at least by the engine.

18. The air conditioner according to claim 10, wherein:

when the cooling load is smaller than a set value smaller than the predetermined value while it is determined that the engine is stopped, the air-conditioning control unit prohibits an output of the motor drive signal to the electric motor, and operation of the compressor is stopped.

* * * * *